W. Jones.
Felting Mach.
Nº 106,171. Patented Aug. 9, 1870.
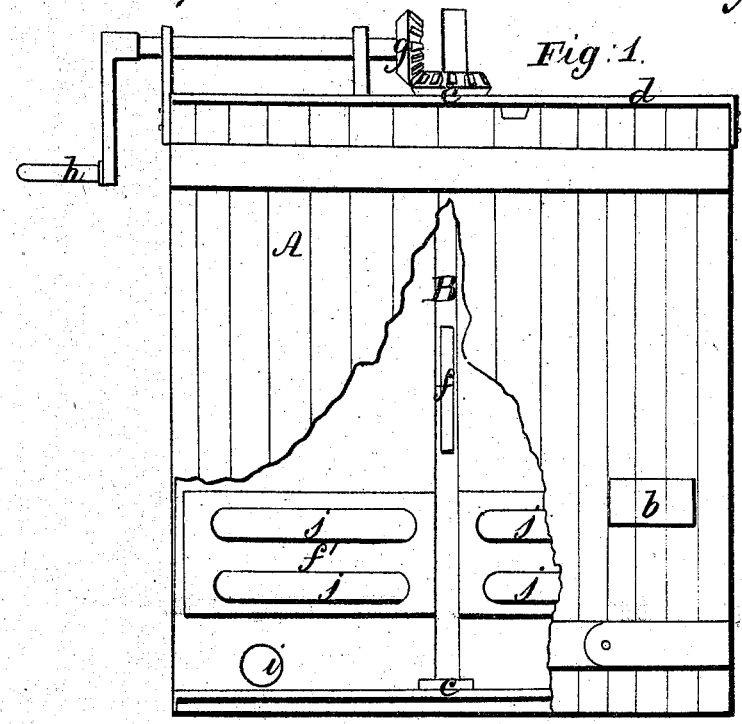
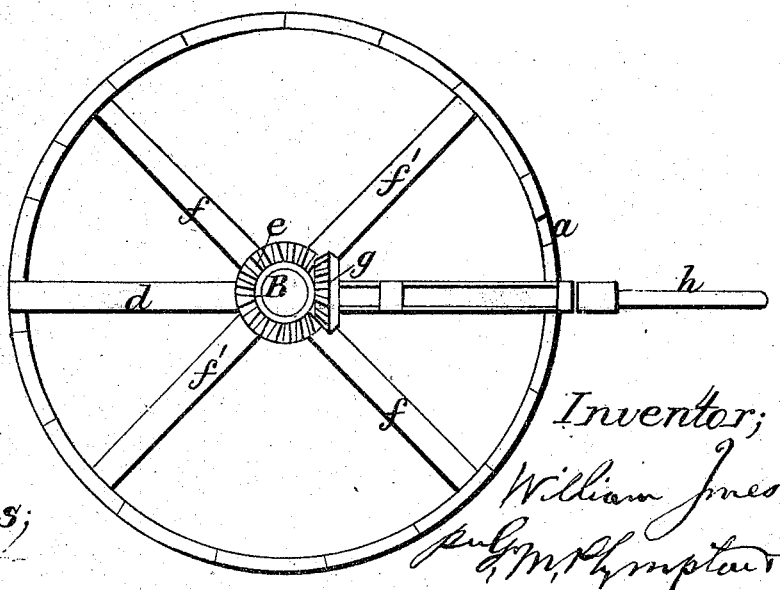
Witnesses:
Inventor;
William Jones

United States Patent Office.

WILLIAM JONES, OF NEW YORK, N. Y.

Letters Patent No. 106,171, dated August 9, 1870.

IMPROVEMENT IN PROCESS OF SEPARATING NAILS FROM FELT.

The Schedule referred to in these Letters Patent and making part of the same.

*To all whom it may concern:*

Be it known that I, WILLIAM JONES, of the city, county, and State of New York, have invented a new and improved Machine for removing nails from old felt, &c., and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

The object of this invention is to separate nails, &c., from old felt that has been stripped from the bottoms of sea-going vessels; these nails, being of copper or composition, are of much value, and to pick them out one by one from the felt, to which they adhere with considerable tenacity, is not only troublesome, but it involves much loss of time.

My invention is clearly illustrated by the accompanying drawings, wherein—

Figure 1 represents a side view of my invention, with a portion of the side broken out, showing the interior mechanism, and Figure 2, a plan or top view of the same.

Similar letters of reference indicate corresponding parts in the several drawings.

A represents a cylindrical vessel of wood or other material, and of any convenient size.

At or near the top is an opening, $a$, to allow the surplus water to pass off.

About midway between the top and bottom is a trap-door, $b$, through which the disintegrated felt may be taken from time to time, and near the bottom is an opening, $i$, through which water may be admitted by means of a pipe.

B is a central spindle, passing through the length of the vessel A, one end being pivoted on the bearing $c$, and the other extending through the cross-bar $d$.

This spindle is fitted with a bevel gear-wheel at $e$, and the part of the spindle that is within the cylindrical vessel is provided with two rings, $ff'$, placed at right angles to each other, so that, when pieces of felt with the nails adhering to them are put into the cylindrical vessel, and the water admitted and the spindle is rotated on its axis by means of the gear-wheel $g$ and crank $h$, the wings will constantly stir up and agitate the mass of felt, nails, and water in the cylindrical vessel; the nails being the heaviest, will, by reason thereof, gravitate to the bottom, the surplus water flowing out of the opening $a$, and the disintegrated felt removed through the trap $b$.

The wings $ff'$ are provided with slots or openings $j$, so that the water &c., may pass freely around the interior of the vessel, and facilitate the operation of the machine.

Having thus described my invention,

What I claim as new, and desire to secure by Letters Patent, is—

The herein described process for separating nails from felt, the same consisting in placing the felt in a vessel, A, containing water and provided with orifices for the admission and escape of water, and having a trap door, $b$, and then subjecting it to the action of rotary beaters B $fj$, operated by means of gearing $h$ $eg$, whereby the nails are loosened from the felt and fall to the bottom of the vessel, all substantially as set forth.

WILLIAM JONES.

Witnesses:
G. M. PLYMPTON,
H. L. WATTENBERG.